United States Patent [19]

Terraillon

[11] 4,039,035
[45] Aug. 2, 1977

[54] WEIGHING BALANCE
[75] Inventor: Paul Terraillon, Monnetier-Mornex, France
[73] Assignee: Terraillon, Annemasse, France
[21] Appl. No.: 656,270
[22] Filed: Feb. 9, 1976
[30] Foreign Application Priority Data
May 16, 1975 Switzerland ............... 6333/75
[51] Int. Cl.² .......................................... G01G 23/06
[52] U.S. Cl. .................................... 177/186; 177/256
[58] Field of Search ............... 177/186, 184, 229, 256, 177/234, 230

[56] References Cited
U.S. PATENT DOCUMENTS

| 2,049,632 | 8/1936 | Sutton | 177/186 |
| 2,788,963 | 4/1957 | Provi | 177/234 X |
| 3,460,642 | 8/1969 | Provi et al. | 177/256 |
| 3,666,031 | 5/1972 | Provi et al. | 177/186 |

FOREIGN PATENT DOCUMENTS

| 2,038,215 | 11/1971 | Germany |
| 1,280,931 | 7/1972 | United Kingdom |
| 868,701 | 5/1961 | United Kingdom |
| 765,678 | 1/1957 | United Kingdom |
| 758,544 | 10/1956 | United Kingdom |
| 533,652 | 2/1941 | United Kingdom |
| 352,331 | 7/1931 | United Kingdom |

OTHER PUBLICATIONS

Randnitz-Reinpell: Handbuch des Waagenbaues, 1 Bd. 1955, Kap. 307, pp. 231-235.

Primary Examiner—Joseph W. Hartary
Attorney, Agent, or Firm—Pennie & Edmonds

[57] ABSTRACT

A weighing balance comprises an anti-shock device arranged in the mechanical linkage between an object receiving plate and a rack and pinion driving an indicating member, to protect the teeth of the rack and pinion when the receiving plate is abruptly loaded or unloaded. The anti-shock device consists of a transmission lever articulated on the rack and held by a spring to transmit translational movement of the receiving plate in normal use, said spring giving way to allow pivoting of the transmission lever in the case of an abnormal shock on the receiving plate.

4 Claims, 6 Drawing Figures

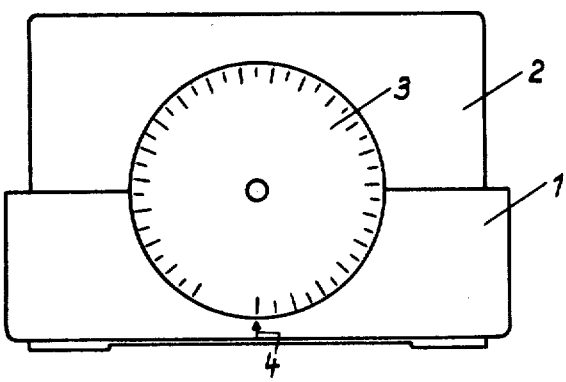
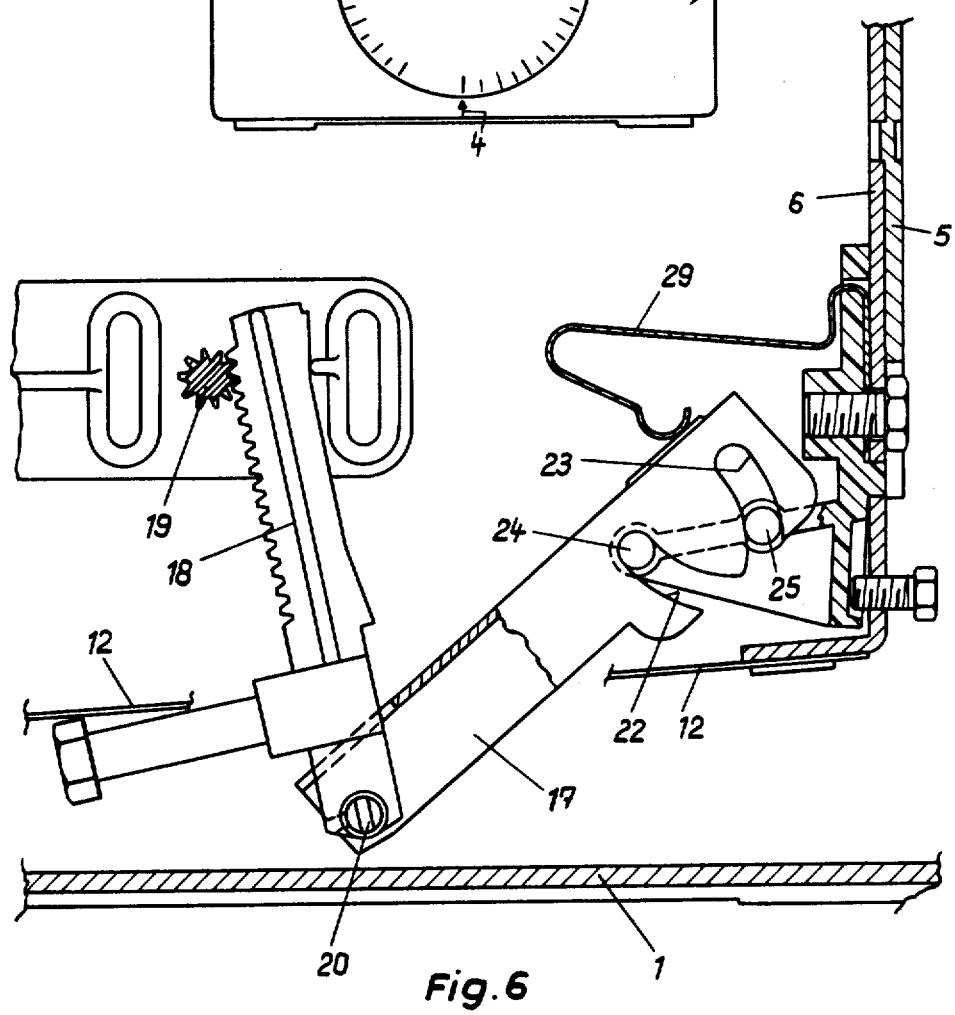

WEIGHING BALANCE

The invention relates to weighing balances of the type comprising a receiving plate for objects to be weighed, movably mounted vertically on a base and connected mechanically to a rack cooperating with a pinion driving a rotatable reading member.

Known balances of this type have a serious drawback especially if, as is often the case nowadays, the rack and the pinion are in plastics material. In effect, when a weight of a certain importance is abruptly or brutally placed on the plate, an impact is produced which is transmitted to the teeth of the rack and pinion. This may cause rupture of some teeth and place the balance out of order. The same disadvantage appears if, when the plate is loaded with a weight of a certain importance, the latter is abruptly removed, for example if the weight is poorly balanced and falls off.

The invention aims to provide a balance of the indicated type which is exempt of the above-mentioned defect.

According to the invention, a weighing balance of the aforementioned type comprises an anti-shock device arranged in the mechanical linkage between the plate and the rack to protect the teeth of the rack and pinion.

The accompanying drawings show, by way of example, an embodiment of the balance according to the invention. In the drawings:

FIG. 1 is an overall front view of the balance;

Figure 2:
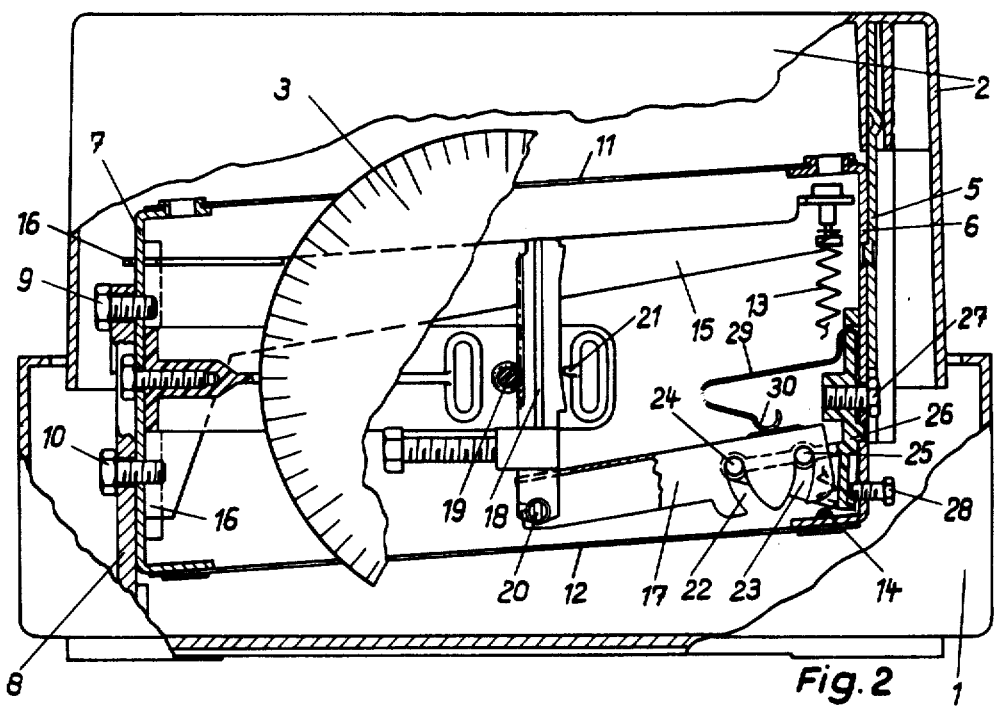
FIG. 2 is a view similar to FIG. 1, but on a greater scale and partially cut away and in cross-section to show the mechanism in the rest position.
Figure 4:
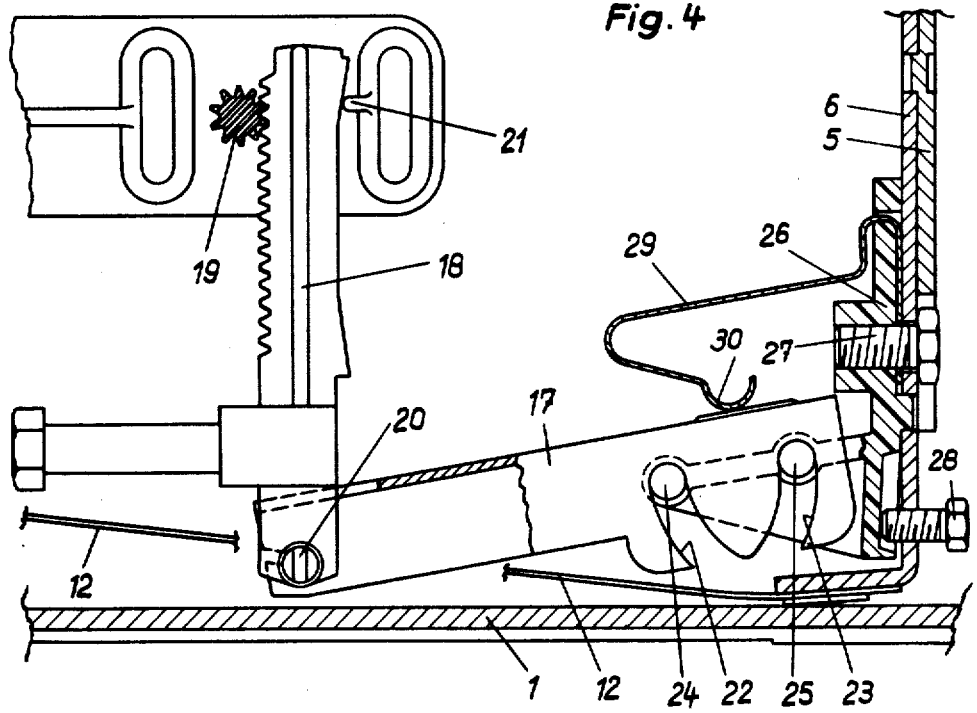
Figure 5:
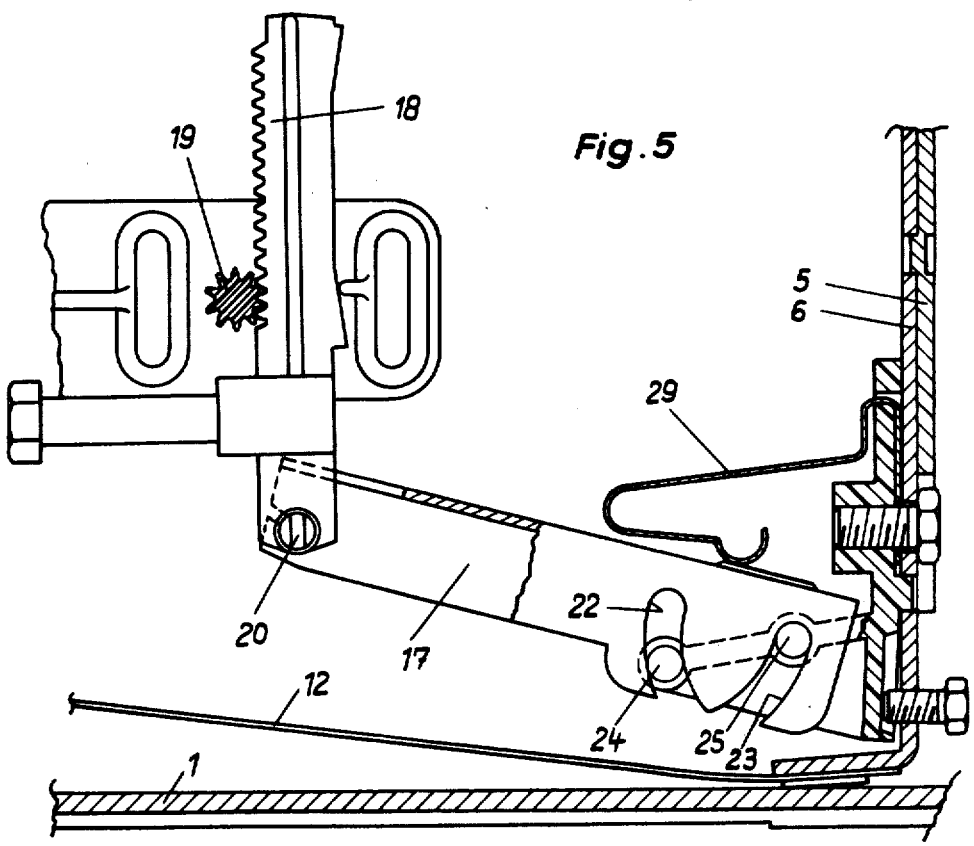

FIG. 4. shows on a greater scale than in FIG. 2 the position occupied by the members of the mechanism when the receiving plate is normally loaded;

FIG. 5 is a similar view showing the position occupied by the members in the case of a shock on the plate due to the abrupt placing of a weight; and FIG. 6 is a view similar to FIG. 5 showing the position occupied by the members of the mechanism when the receiving plate which was loaded is abruptly unloaded, so that this plate receives a shock in the opposite direction to that in the case of FIG. 5.

The balance shown comprises a base 1 intended to rest on a horizontal surface and a receiving plate 2 for objects to be weighed, which is movably mounted vertically on the base 1. A display of the weight on plate 2 is given by a graduated disc 3 turning facing a fixed index 4 on the base 1.

Figure 3:
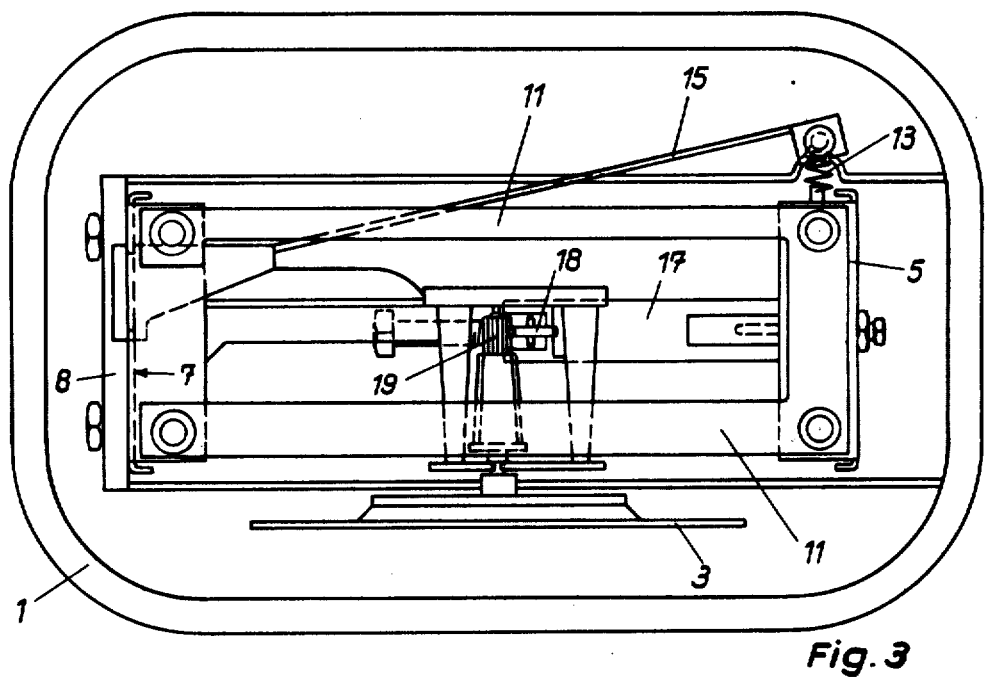
FIG. 3 is a plan view corresponding to FIG. 2, but with the receiving plate removed.

The receiving plate 2 is mounted in a semi-permanent manner on a vertical plate 5 which is permanently fixed on another vertical plate 6 forming one of the sides of a deformable parallelogram. The sides of this parallelogram opposite plate 6 is also formed by a vertical plate 7 which is fixed, by means of screws 9, 10, on a vertical support 8, itself fixed on the lower part of base 1. The two other sides of the parallelogram are formed of flexible metallic blades 11, 12 fixed on plates 6 and 7. As shown on FIG. 3 there are two blades 11; likewise, there are two blades 12.

It is understood that, starting from the position shown on FIG. 2, if a weight is placed on the receiving plate 2, this plate moves down and in its vertical movement drives the plate 6, with a bending of the blades 11, 12 of the parallelogram. An upward biasing force on the plate 2 is thus provided by the blades 11, 12 and also by a weighing spring 13 fixed at its lower end at 14 near the end of a blade 12 and at its upper part to a fixed point formed by the free end of a cantilever 15 fixed at its opposite end 16 to the fixed plate 7.

The vertical movement of plate 2 is transmitted to the graduated disc 3 by the intermediary of a transmission lever 17, a rack 18 and a pinion 19 to which the disc 3 is angularly fixed. The left-hand end of the transmission lever 17 (looking at the drawings) is articulated at 20 to the lower end of rack 18. The rack 18 is arranged generally vertical and its teeth are held in mesh with the pinion 19 by means of a fixed bearing member 21 cooperating with a profiled rear face of the rack 18 which allows tilting of the rack about the pinion 19 and raising and lowering of the rack.

A double anti-shock effect is ensured by the following arrangement. The transmission lever 17 has two arcuate slots 22 and 23 cooperating respectively with fingers 24, 25 on a piece 26 fixed to plate 6 by means of a screw 27. A setting screw 28 enables slight variation of the position of fingers 24, 25 in relation to plate 6. A blade spring 29 is fixed by one of its ends between the piece 26 and plate 6 and its opposite end 30 acts on the transmission lever 17 to exert a force in a direction passing between the fingers 24, 25 in the plane of symmetry of the fingers and the corresponding slots 22, 23. The force of spring 29 is provided so that in conditions of normal operation, i.e. in the absence of shocks, this spring holds the ends of slots 22, 23 in contact with fingers 24, 25 as shown on FIG. 2. In these conditions, the lever 17 is held angularly fixed in relation to plate 6 and consequently moves with a vertical translational movement when the plate 2 moves vertically. Hence the vertical movement of the receiving plate is transmitted to the rack 18 which rotates the graduated disc 3 by the intermediary of pinion 19.

FIG. 4 shows the position occupied by lever 17, rack 18 and fingers 24, 25 when the plate 2 is loaded and is located at the lower end-of-path, the fingers 24, 25 remaining in contact with the ends of the slots 22, 23.

FIG. 5 illustrates what happens when, with the balance in its rest position shown on FIG. 2, the receiving plate 2 is abruptly or brutally loaded, i.e. receives a vertical, downwardly-directed shock. Under the effect of this downwardly-directed vertical shock, the plate 2 moves down abruptly and, before the transmission lever 17 begins a corresponding translational movement, the spring 29 gives way and lever 17 pivots about its articulation 20 and about finger 25 to the position shown on FIG. 5, in which the finger 24 has left the end of slot 22, whereas finger 25 remains at the end of slot 23. The vertical movement of the receiving plate 2 and the plates 5, 6 is thus not transmitted to the rack 18, so that the teeth of rack 18 and pinion 19 are not subjected to any abnormal effort. As soon as the shock is over, the lever 17 progressively returns to its normal position in which the end of slot 22 comes into contact with finger 24 and, during this pivoting movement about finger 25, the rack 18 is driven downwards, but without any abnormally high efforts being exerted on the teeth.

In the opposite case, the receiving plate 2 is at the lower end-of-path, bearing the maximum load and is abruptly unloaded, for example because the load overturns and falls off. In this case, the plate is submitted to an upwardly-directed vertical shock and, under the effect of this shock, the plates 5, 6 abruptly pass from the position of FIG. 4 to that shown in FIG. 6. Under the combined effect of the rapidity of this movement and the strength of spring 29, the latter gives way and allows the lever 17 to pivot about its articulation 20 and finger 24 to the position shown on FIG. 6 in which the finger 24 is in contact with the end of slot 22 whereas, this time, finger 25 has left the bottom of slot 23. The rack 18 thus undergoes no effort tending to raise it back to the rest position but, under the effect of the abrupt pivoting of lever 17, is simply pivoted about its point of contact with the pinion 19, which does not involve any harmful effort on the teeth. Once the shock is over, the lever 17 moves back to its normal position and the rack 18 moves up to the rest position, but at normal speed, i.e. without any harmful effect on the teeth of the rack 18 and pinion 19.

The described anti-shock device thus protects the delicate teeth of the rack and pinion against any possible damage in the case of a shock on the receiving plate, either downwards or upwards. The anti-shock device thus has a double effect.

What is claimed is:

1. A weighing balance comprising a base, a chassis mounted on said base for vertical movement relative thereto, a receiving plate for objects to be weighed mounted on said chassis, a rotatable dial member, a rack and pinion, said pinion being mounted to rotate said dial upon actuation by its cooperating rack, a transmission lever articulated to said rack, said transmission lever also being connected to said chassis by antishock means, said antishock means including two fingers and two cooperating arcuate slots, elastic means for holding said fingers in contact with the ends of their respective slots in the absence of a shock, said elastic means yielding when said receiving plate is subjected to a shock to allow the transmission lever to turn about its articulation on the rack instead of actuating the rack, the yielding of said elastic means also providing a relative movement between one of the fingers and its slot for a shock in one direction and between the other finger and its slot for a shock in the opposite direction.

2. A balance according to claim 1 in which the elastic means is so positioned as to re-establish automatically the connection between said transmission lever and said chassis for proper readout of said dial promptly after yielding to a shock.

3. A balance according to claim 1, in which said elastic means exert on the transmission lever a force in a direction passing between said two fingers.

4. A balance according to claim 3, in which said elastic means are formed by a single blade spring.

* * * * *